United States Patent
Kasahara et al.

(10) Patent No.: US 6,330,119 B1
(45) Date of Patent: Dec. 11, 2001

(54) MANUFACTURING METHOD FOR OPTICAL PICKUP DEVICE

(75) Inventors: Satoshi Kasahara; Hisao Isobe, both of Simosuwa-machi (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/589,033

(22) Filed: Jun. 6, 2000

(30) Foreign Application Priority Data

Jun. 8, 1999 (JP) .................................................. 11-160331

(51) Int. Cl.$^7$ ....................................................... G02B 7/02
(52) U.S. Cl. ............................ 359/813; 359/814; 359/824
(58) Field of Search ............................ 359/811; 259/813, 259/814, 823, 824; 369/44.14

(56) References Cited

U.S. PATENT DOCUMENTS 5,999,342 * 12/1999 Okada et al. ......................... 359/813

* cited by examiner

Primary Examiner—Georgia Epps
Assistant Examiner—Saeed Seyrafi
(74) Attorney, Agent, or Firm—Hogan & Hartson, L.L.P.

(57) ABSTRACT

A method used during the manufacturing of a device of an optical pickup device for bonding and fixing drive coils to a lens holder or other parts of a drive device. The optical pickup device has a lens holder and a magnetic drive device for driving the lens holder in a tracking direction and a focusing direction, the magnetic drive device having a permanent magnet and drive coils fixed to the lens holder. The method includes providing a fuse wire having a wire and a fuse coating covering the wire, pressing the fuse wire on the lens holder at a predetermined position, energizing the fuse wire in the pressed position to melt the fuse coating, and curing the melt fuse coating to bond and fix the fuse wire to the lens holder to form the drive coils. Alternatively, the fuse wire may be melt first and then pressed to the desired position of the lens holder. The current used for energizing the coil to melt the fuse coating or fuse film is much larger than drive currents used during normal operation of the optical pickup device.

11 Claims, 2 Drawing Sheets

MANUFACTURING METHOD FOR OPTICAL PICKUP DEVICE

BACKGROUND OF THE INVENTION

1. Field of the Invention

This invention relates to an optical pickup device provided with a drive mechanism for driving a lens holder in a tracking direction and a focusing direction using magnetic forces. In particular, it relates to a method for fixing a drive coil used to generate the magnetic forces to the lens holder.

2. Description of the Related Art

Optical pickup devices used for reproduction information from CDs, DVDs and other optical recording media are provided with an objective lens drive device which is used to converge laser light to a target position on the recording surface of the optical recording medium. The objective lens drive device can drive the objective lens in a focusing direction and a tracking direction. Such objective lens drive devices include well-known magnetic type drive devices which use permanent magnets and drive coils. The drive coils are generally attached to the side of the lens holder that retains the objective lens. In addition to direct winding, a bonding agent can be used to fix the drive coils to the lens holder. Ultraviolet light curing type bonding agents and epoxy group resin bonding agents are typically used.

Ultraviolet light curing type bonding agents are typically cured by using ultraviolet irradiation for approximately 30 seconds. However, when such bonding agents are used, the surface of the lens holder often remains sticky after curing. As the lens holder moves, the sticky bonding agent can cause the lens holder to stick to other parts and impeding the normal driving process.

On the other hand, while epoxy group resin bonding agents do not stick to the surface after curing, the curing process takes a longer time and the unit must usually be set aside in an environment of 100° C. for approximately 30 minutes. As a result, during the time the epoxy is cured, the drive coils must be pressed by a jig to a position where they are attached to the lens holder. Often the drive coils must be temporarily bonded to the lens holder using an instant or other type of bonding agent until the curing process takes place. Thus, the bonding and fixing method using an epoxy group resin bonding agent is complex and time-consuming.

SUMMARY OF THE INVENTION

Accordingly, the present invention is directed to a manufacturing method for an optical pickup device including bonding and fixing drive coils to a lens holder that substantially obviates one or more of the problems due to limitations and disadvantages of the related art.

It is an object of the present invention to provide a manufacturing method for an optical pickup device whereby drive coils can be bonded and fixed to a lens holder by using simple operations without using an ultraviolet light curing type bonding agent.

It is another object of the present invention to provide a method for manufacturing the optical pickup device which uses simple operations to bond and fix drive coils to a lens holder even when an epoxy group resin bonding agent is required.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a method for manufacturing an optical pickup device having a lens holder and a magnetic drive device for driving the lens holder, the magnetic drive device having a permanent magnet and drive coils fixed to the lens holder, the method including providing a fuse wire having a wire and a fuse coating covering the wire, the fuse coating having a predetermined melting temperature, pressing the fuse wire on the lens holder at a predetermined position, energizing the fuse wire in the pressed position to melt the fuse coating, and curing the melt fuse coating to bond and fix the fuse wire to the lens holder to form the drive coils.

Another method for manufacturing the optical pickup device according to the present invention includes providing a fuse wire having a wire and a fuse coating covering the wire, the fuse coating having a predetermined melting temperature, energizing the wire to melt the fuse coating, subsequently pressing the fused wire to the lens holder at a predetermined position, and curing the melt fuse coating to bond and fix the fuse wire to the lens holder to form the drive coils.

Yet another method for manufacturing the optical pickup device according to the present invention includes pressing a wire on the lens holder at a predetermined position with a fuse film having a predetermined melting temperature interposed between the wire and the lens holder, energizing the wire in the pressed position to melt the fuse film, and curing the melt fuse film by stopping the energizing process to bond and fix the wire to the lens holder to form the drive coils.

In another aspect, the present invention provides an optical pickup device having a lens holder for holding an objective lens and a magnetic drive device for driving the lens holder in a tracking direction and a focusing direction, the magnetic drive device having a permanent magnet and drive coils fixed to the lens holder, wherein the coils comprise a wire bonded and fixed to the lens holder by a thermal fusing material having a predetermined melting temperature.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
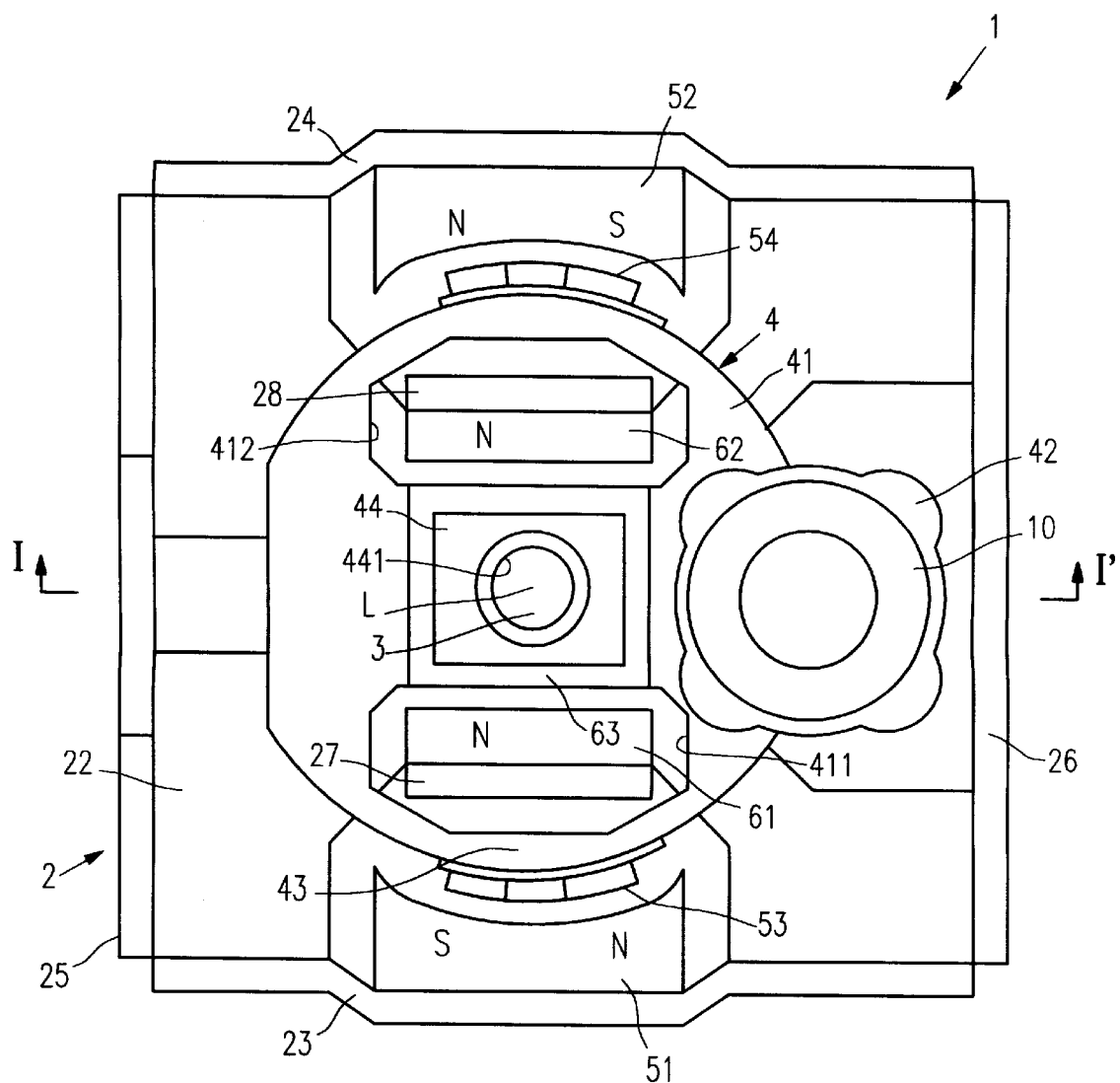
FIG. 1 is a plan view of an objective lens drive device according to an embodiment of the present invention.
Figure 2:
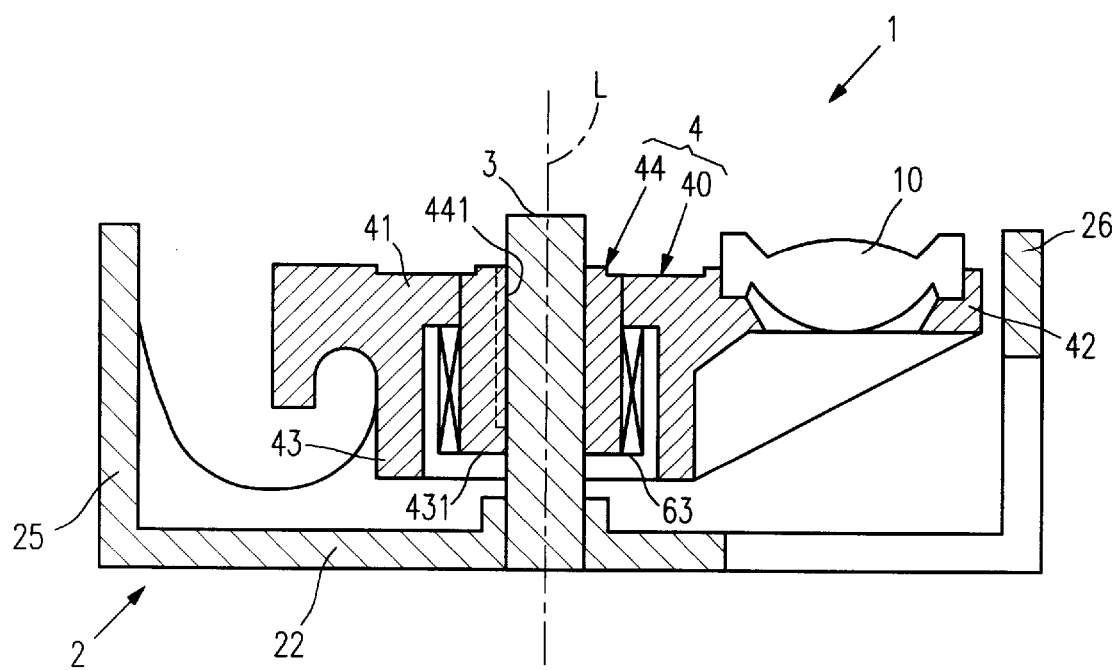
FIG. 2 is a sectional view of the objective lens drive device of FIG. 1 along the line I–I' of FIG. 1.

FIGS. 1 and 2 illustrate a shaft sliding and turning type objective lens drive device of an optical pickup device in which the present invention may be applied. FIG. 1 is a plan view of the objective lens drive device. FIG. 2 is a sectional view of the objective lens drive device along the line I–I' of FIG. 1. As shown in the figures, the objective lens drive device 1 is provided with a lens holder 4 which retains the objective lens 10 and a holder support member 2 which supports the lens holder. The holder support member 2 is provided with a generally rectangular bottom wall 22 and side walls 23–26 rising vertically from the four sides of the generally rectangular bottom wall. A sliding shaft 3 is located approximately at the center of the drive device. Inside the side walls 23–26, tracking drive magnets 51, 52, each having two magnetic poles arranged along the peripheral direction about the sliding shaft 3, are bonded and fixed respectively to the inside surfaces of the side walls 23, 24 which extend parallel to each other. A pair of interior walls 27, 28 extend from the bottom wall and are parallel to the side walls 23, 24 on which the tracking drive magnets 51, 52 are attached. The lens holder has openings 411, 412 through which the interior walls 27, 28 are inserted. Focusing drive magnets 61, 62 are fixed respectively to the inside surfaces of the interior walls 27, 28 and extend inwardly, and have faces that are magnetized to have a single magnetic pole.

The sliding shaft 3 is fixed to a center part of the bottom wall 22 and is located between the pair of inside walls 27, 28. The lens holder 4 is supported by the sliding shaft 3 and is able to slide along and rotate about the sliding shaft 3. The lens holder 4 is provided with a lens retaining part 40 on which the objective lens 10 is attached, and a cylindrical bearing part 44 having a shaft hole 441 which accommodates the sliding shaft 3. The lens retaining part 40 is provided with a cylindrical waist part 43 and a top plate 41 which covers the top side of the waist part. The cylindrical bearing part 44 is formed integrally at the center of the waist part 43. A lens attachment part 42 which slightly overhangs to the outside is formed on the top plate 41, and the objective lens 10 is bonded and fixed on top of the lens attachment part 42. A pair of openings 411, 412 on the top plate 41 are formed at positions on both sides of the bearing part 44. The sliding shaft 3 which stands up directly from the bottom wall 22 on the holder support member 2 is inserted in the shaft hole 441 formed on the bearing part 44 of the lens holder 4. The pair of inside walls 27, 28 rising directly from the bottom wall 22 is inserted respectively on the inside of the pair of openings 411, 412 formed on the top plate 41 of the lens holder 4. As a result, the bearing part 44 of the lens holder 4 is positioned between the focusing drive magnets 61, 62 which are attached respectively to the pair of inside walls 27, 28.

A focusing drive coil 63 is wound around the outside surface of the lower side of the bearing part 44 of the lens holder 4 so that it forms a rectangular shape centered on the sliding shaft 3. A focusing magnet drive circuit which moves the lens holder 4 up and down along the sliding shaft 3 is provided for the focusing drive coil 63 and the focusing drive magnets 61, 62. A pair of tracking drive coils 53, 54 are attached at a position between the tracking drive magnets 51, 52 and the inside walls 27, 28 rising straight up from the bottom wall so that they face the tracking drive magnets 51, 52. A tracking magnet drive circuit which turns the lens holder 4 around the sliding shaft 3 is provided for the tracking drive coils 53, 54 and the tracking drive magnets 51, 52.

A method for assembling the lens holder 4 is described now, the method including bonding and fixing the focusing drive coil 63 and the tracking drive coils 53, 54 to the lens holder 4.

The focusing drive coil 63 and the tracking drive coils 53, 54 in the present embodiment are formed of thermal fusing type of fused wire. The coils include wires and a polyamide group fuse coating that covers the surface of the wires. The coating is fused or melt and the wires are bonded to each other by winding the wire while applying a hot blast. As a result, they are shaped into desired shapes for the focusing drive coil or the tracking drive coil. Specifically, the focusing drive coil are formed into a square-shaped cylindrical coil, while the tracking drive coils are formed into plane type of flat coils. Re-fusing can be carried out for this types of coils after the coil is formed, by passing a current through the coil to generate heat to heat the unit to above a certain temperature (the melting temperature of the coating) to melt the fuse coating.

In a preferred embodiment, the drive coil (either a focusing drive coil or a tracking drive coil) that is configured as indicated above is bonded and fixed to the lens holder as described below. First, the drive coil is retained at a desired position of the lens holder using a jig. Next, the drive coil is energized by a passing a current through the wire to heat the wire so that the polyamide group coating covering the wire reaches its melting temperature. As a result, the polyamide group fuse coating covering the wire is melted. After this, the energizing process is stopped and the drive coil is cooled by setting it aside for an appropriate period of time. The current value used to melt the polyamide group fuse coating is much larger than the current that energizes the coils during normal focusing and tracking operations of the optical pickup device, so the normal focusing and tracking operations does not produce any adverse effects. The polyamide group fuse coating that has been melted is cured and becomes bonded and fixed to the lens holder. The jig used to retain the drive coil is then removed from the coil, and the drive coil is now bonded and fixed to the lens holder.

In a preferred embodiment, the drive coils are retained so that they are pressed to a desired position on the lens holder before the drive coils are energized so that the drive coils are bonded and fixed to the lens holder. Alternatively, the above steps may be performed in the opposite order, namely, the wire is energized and the coating is melted while the drive coils are retained by the jig, and then the coils are pressed to desired positions on the lens holder in the melt state.

If the part of the jig that contacts the coils is formed of a permeable material, undesirable result may occur when the jig contacts the drive coils when the coils are being retained. Therefore, it is desirable that the material used for the part of the jig that contacts the coils not be permeable and have no affinity with the polyamide.

In another embodiment, a drive coil without thermal fusing coating is used, and a fuse film made of a thermal fusing material such as a polyamide resin material is be provided between the drive coil and the lens holder. The contact between the fuse film and the coils and the lens holder is maintained with the jig, and the drive coils are energized to produce heat to melt the fuse film. The energizing current is then stopped and the drive coils are set aside to cool, whereby the fuse film is cured and the wires are bonded and fixed to the lens holder to form the drive coils.

To supplement the bonding power provided by the thermal fusing bonding agent (the fuse coating or the fuse film), an epoxy group bonding agent may be applied after curing for reinforcement. In this case, although the curing process for the epoxy group bonding agent is time consuming, the temporary fixing process required for retaining the drive coils to a desired position of the lens holder is previously completed. As a result, no jig is required to retain the drive coils to the desired positions of the lens holder during the curing process for the epoxy group bonding agent.

In summary, in a method according to the present invention, thermal fusing type drive coils are pressed to a desired position on the lens holder, heat is generated by passing a current through the coils held in the desired positions, and the fuse coating covering the wire of the drive coils is melted and the drive coils are bonded and fixed to the lens holder. As a result, the drive coils are bonded and fixed to the lens holder through simple operations.

It is noted that a residual stress may remain in the coils if a press-forming work or the like is performed on the coils during a winding process. When the fused layer between the windings of the drive coils is melted again after the coil is formed (re-fusing), this residual stress can be eliminated or reduced. Therefore, the method according to the present invention is advantageous in that it prevents the wound coils from becoming loose due to a residual stress even when an excess current passes through the coils during operation to cause the fuse layer of the drive coils to reach its melting temperature.

In another method according to the present invention, a thermal fusing resin film is present between the drive coils and the lens holder, the drive coils are energized in the pressed state, the resin film is melt by the heat generated by the current, and the drive coils are bonded and fixed to the lens holder. When this method is used, the drive coils can be bonded and fixed to the lens holder using simple operations and the residual stress of the winding on the drive coils can be reduced or eliminated.

It will be apparent to those skilled in the art that various modifications and variations can be made in the methods of manufacturing an optical pickup device of the present invention without departing from the spirit or scope of the inventions. For example, any suitable thermal fusing material may be used to form the fuse coating or the fuse film. Further, the method is not limited to bonding and fixing the coils to the lens holder, and may be used when drive coils are bonded to other parts of the optical pickup device or other devices. Thus, it is intended that the present invention cover modifications and variations of this invention that come within the scope of the appended claims and their equivalents.

What is claimed is:

1. A method for manufacturing an optical pickup device having a lens holder for holding an objective lens and a magnetic drive device for driving the lens holder in a tracking direction and a focusing direction, the magnetic drive device having a permanent magnet and drive coils fixed to the lens holder, the method comprising:

providing a fuse wire having a wire and a fuse coating covering the wire, the fuse coating having a predetermined melting temperature;

pressing the fuse wire on the lens holder;

energizing the fuse wire in the pressed position to melt the fuse coating; and curing the melt fuse coating to bond and fix the fuse wire to the lens holder to form the drive coils.

2. The method of claim 1, further comprising applying an epoxy group bonding agent to the drive coils after the curing step to reinforce the bonding and fixing of the drive coils to the lens holder.

3. The method of claim 1, wherein the drive coils include a focusing drive coil and a tracking drive coil, the method further comprising passing a fusing current through the drive coils, the current being greater than driving currents used during focusing and tracking operation of the optical pickup device.

4. A method for manufacturing an optical pickup device having a lens holder for holding an objective lens and a magnetic drive device for driving the lens holder in a tracking direction and a focusing direction, the magnetic drive device having a permanent magnet and drive coils fixed to the lens holder, the method comprising:

providing a fuse wire having a wire and a fuse coating covering the wire, the fuse coating having a predetermined melting temperature;

energizing the fuse wire to melt the fuse coating;

subsequently pressing the fused wire to the lens holder; and curing the melt fuse coating to bond and fix the fuse wire to the lens holder to form the drive coils.

5. The method of claim 4, further comprising applying an epoxy group bonding agent to the drive coils after the curing step to reinforce the bonding and fixing of the drive coils to the lens holder.

6. The method of claim 4, wherein the drive coils include a focusing drive coil and a tracking drive coil, the method further comprising passing a fusing current through the drive coils, the current being greater than driving currents used during focusing and tracking operation of the optical pickup device.

7. A method for manufacturing an optical pickup device having a lens holder for holding an objective lens and a magnetic drive device for driving the lens holder in a tracking direction and a focusing direction, the magnetic drive device having a permanent magnet and drive coils fixed to the lens holder, the method comprising:

pressing a wire on the lens holder with a fuse film having a predetermined melting temperature interposed between the wire and the lens holder;

energizing the wire in the pressed position to melt the fuse film; and curing the melt fuse film by stopping the energizing process to bond and fix the wire to the lens holder to form the drive coils.

8. The method of claim 7, wherein the fuse film comprises a polyamide resin.

9. The method of claim 8, further comprising applying an epoxy group bonding agent to the drive coils after the curing step to reinforce the bonding and fixing of the drive coils to the lens holder.

10. The method of claim 7, wherein the drive coils include a focusing drive coil and a tracking drive coil, the method further comprising passing a fusing current through the drive coils, the current being greater than driving currents used during focusing and tracking operation of the optical pickup device.

11. An optical pickup device having a lens holder for holding an objective lens and a magnetic drive device for driving the lens holder in a tracking direction and a focusing direction, the magnetic drive device having a permanent magnet and drive coils fixed to the lens holder, wherein the coils comprise a wire bonded and fixed to the lens holder by a thermal fusing material having a predetermined melting temperature.

* * * * *